US012681161B2

(12) United States Patent
Chen et al.

(10) Patent No.: US 12,681,161 B2
(45) Date of Patent: Jul. 14, 2026

(54) WI-FI BASED HUMAN PRESENCE AND MOTION DETECTION

(71) Applicant: Samsung Electronics Co., Ltd.,
Suwon-si (KR)

(72) Inventors: Guanbo Chen, Mckinney, TX (US);
Yuming Zhu, Plano, TX (US);
Hao-Hsuan Chang, Plano, TX (US);
Hao Chen, Allen, TX (US); Songwei Li, Mckinney, TX (US); Hoang Viet Nguyen, Frisco, TX (US); Siddharth K. Advani, Allen, TX (US)

(73) Assignee: Samsung Electronics Co., Ltd.,
Suwon-si (KR)

( * ) Notice: Subject to any disclaimer, the term of this patent is extended or adjusted under 35 U.S.C. 154(b) by 304 days.

(21) Appl. No.: 18/595,135

(22) Filed: Mar. 4, 2024

(65) Prior Publication Data

US 2024/0329227 A1 Oct. 3, 2024

Related U.S. Application Data

(60) Provisional application No. 63/456,723, filed on Apr. 3, 2023.

(51) Int. Cl.
G01S 13/56 (2006.01)
H04B 17/309 (2015.01)

(52) U.S. Cl.
CPC ............ G01S 13/56 (2013.01); H04B 17/309 (2015.01)

(58) Field of Classification Search
CPC ................ C12Q 1/6881; C12Q 1/6883; C12Q 2600/154; G01S 13/04; G01S 13/56; G01S 13/88; G01S 13/887; H04B 17/309
See application file for complete search history.

(56) References Cited

U.S. PATENT DOCUMENTS

| | | | | |
|---|---|---|---|---|
| 10,393,866 B1 * | 8/2019 | Kravets | ................. | G01S 13/003 |
| 10,600,314 B1 * | 3/2020 | Manku | ................... | G08B 21/22 |

(Continued)

FOREIGN PATENT DOCUMENTS

| | | |
|---|---|---|
| CN | 114079859 A | 2/2022 |
| CN | 112869734 B | 10/2022 |

(Continued)

OTHER PUBLICATIONS

International Search Report and Written Opinion issued Jul. 2, 2024 regarding International Application No. PCT/KR2024/004229, 11 pages.

(Continued)

*Primary Examiner* — Peter M Bythrow

(57) ABSTRACT

A method includes obtaining wireless fidelity (Wi-Fi) based channel state information (CSI). The method also includes filtering the CSI to remove radio frequency (RF) interference. The method further includes executing a motion detection module that detects for motion in a space based on whether macro-movements are present in the filtered CSI, and provides an indication that the space is occupied upon detecting motion in the space. The method also includes, in response to the indication that the space is occupied, executing an occupancy detection module that detects whether the space is still occupied based on whether micro-movements and breath signals are present in the filtered CSI, retains the indication that the space is occupied upon detecting that the space is still occupied, and provides an indication that the space is not occupied upon detecting that the space is no longer occupied.

20 Claims, 14 Drawing Sheets

400

(56) References Cited

U.S. PATENT DOCUMENTS

| | | | | |
|---|---|---|---|---|
| 10,909,562 | B2 * | 2/2021 | Roeding | G06Q 30/0207 |
| 11,035,940 | B2 * | 6/2021 | Xu | G01S 13/765 |
| 11,408,978 | B2 * | 8/2022 | Wang | A61B 5/0816 |
| 11,500,058 | B2 * | 11/2022 | Hu | G01S 13/003 |
| 11,531,087 | B2 * | 12/2022 | Hu | G08B 21/0469 |
| 11,616,553 | B1 * | 3/2023 | Kachroo | H04L 5/0062 |
| | | | | 375/262 |
| 12,041,513 | B2 * | 7/2024 | Deixler | H04W 4/80 |
| 2013/0150743 | A1 * | 6/2013 | Tomimori | A61B 5/33 |
| | | | | 600/521 |
| 2017/0090026 | A1 * | 3/2017 | Joshi | G01S 13/87 |
| 2019/0028320 | A1 * | 1/2019 | Xu | H04L 27/362 |
| 2020/0371222 | A1 | 11/2020 | Kravets | |
| 2021/0173045 | A1 * | 6/2021 | Hu | G01S 7/415 |
| 2021/0333351 | A1 * | 10/2021 | Zandifar | G01S 5/021 |
| 2022/0173939 | A1 | 6/2022 | Omer | |
| 2022/0308195 | A1 * | 9/2022 | Zeng | G01S 13/003 |
| 2023/0171563 | A1 * | 6/2023 | Toner | H04L 67/53 |
| | | | | 455/456.1 |
| 2023/0397824 | A1 * | 12/2023 | Yang | A61B 5/0507 |

FOREIGN PATENT DOCUMENTS

| | | |
|---|---|---|
| CN | 115299917 A | 11/2022 |
| EP | 3692898 A1 | 8/2020 |
| KR | 10-2021-0077516 A | 6/2021 |
| WO | 2017100706 A1 | 6/2017 |
| WO | 2022095869 A1 | 5/2022 |

OTHER PUBLICATIONS

Extended European Search Report dated Dec. 23, 2025, in connection with European Patent Application No. 24785160.3, 13 pages.

Wu, et al., "Non-Invasive Detection of Moving and Stationary Human with WiFi," IEEE Journal on Selected Areas in Communications, Nov. 2015, vol. 33(11), 14 pages.

* cited by examiner

All CSI

Nohighpeak CSI

WI-FI BASED HUMAN PRESENCE AND MOTION DETECTION

CROSS-REFERENCE TO RELATED APPLICATION(S) AND CLAIM OF PRIORITY

This application claims priority under 35 U.S.C. § 119(e) to U.S. Provisional Patent Application No. 63/456,723, filed on Apr. 3, 2023, which is hereby incorporated by reference in its entirety.

TECHNICAL FIELD

This disclosure relates generally to wireless communications systems. Embodiments of this disclosure relate to methods and apparatuses for wireless fidelity (Wi-Fi) based human presence and motion detection.

BACKGROUND

Presence detection is a useful feature in many current smart home devices. Presence detection provides a foundation for other features such as smart control of lighting, heating, ventilation, and air conditioning. This feature is currently achieved using different modalities, including cameras and infrared (IR) sensors, but each method has its own disadvantage. Wi-Fi is a widely used wireless communication technology that already exists in many smart home devices. Developing methods to utilize existing Wi-Fi signals for presence detection is of great interest to many companies, but current techniques have a number of limitations.

SUMMARY

Embodiments of the present disclosure provide methods and apparatuses for Wi-Fi based human presence and motion detection.

In one embodiment, a method includes obtaining Wi-Fi based channel state information (CSI). The method also includes filtering the CSI to remove radio frequency (RF) interference. The method further includes executing a motion detection module that detects for motion in a space based on whether macro-movements are present in the filtered CSI, and provides an indication that the space is occupied upon detecting motion in the space. The motion detection module detects for motion during a first observation window. The method also includes, in response to the indication that the space is occupied, executing an occupancy detection module that detects whether the space is still occupied based on whether micro-movements and breath signals are present in the filtered CSI, retains the indication that the space is occupied upon detecting that the space is still occupied, and provides an indication that the space is not occupied upon detecting that the space is no longer occupied. The occupancy detection module detects for motion during a second observation window, the second observation window being longer than the first observation window.

In another embodiment, a device includes a transceiver and a processor operably connected to the transceiver. The processor is configured to: obtain Wi-Fi based CSI; filter the CSI to remove RF interference; execute a motion detection module that detects for motion in a space based on whether macro-movements are present in the filtered CSI, and provides an indication that the space is occupied upon detecting motion in the space; and in response to the indication that the space is occupied, execute an occupancy detection module that detects whether the space is still occupied based on whether micro-movements and breath signals are present in the filtered CSI, retains the indication that the space is occupied upon detecting that the space is still occupied, and provides an indication that the space is not occupied upon detecting that the space is no longer occupied. The motion detection module detects for motion during a first observation window, and the occupancy detection module detects for motion during a second observation window, where the second observation window being longer than the first observation window.

In another embodiment, a non-transitory computer readable medium includes program code that, when executed by a processor of a device, causes the device to: obtain Wi-Fi based CSI; filter the CSI to remove RF interference; execute a motion detection module that detects for motion in a space based on whether macro-movements are present in the filtered CSI, and provides an indication that the space is occupied upon detecting motion in the space; and in response to the indication that the space is occupied, execute an occupancy detection module that detects whether the space is still occupied based on whether micro-movements and breath signals are present in the filtered CSI, retains the indication that the space is occupied upon detecting that the space is still occupied, and provides an indication that the space is not occupied upon detecting that the space is no longer occupied. The motion detection module detects for motion during a first observation window, and the occupancy detection module detects for motion during a second observation window, where the second observation window being longer than the first observation window.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
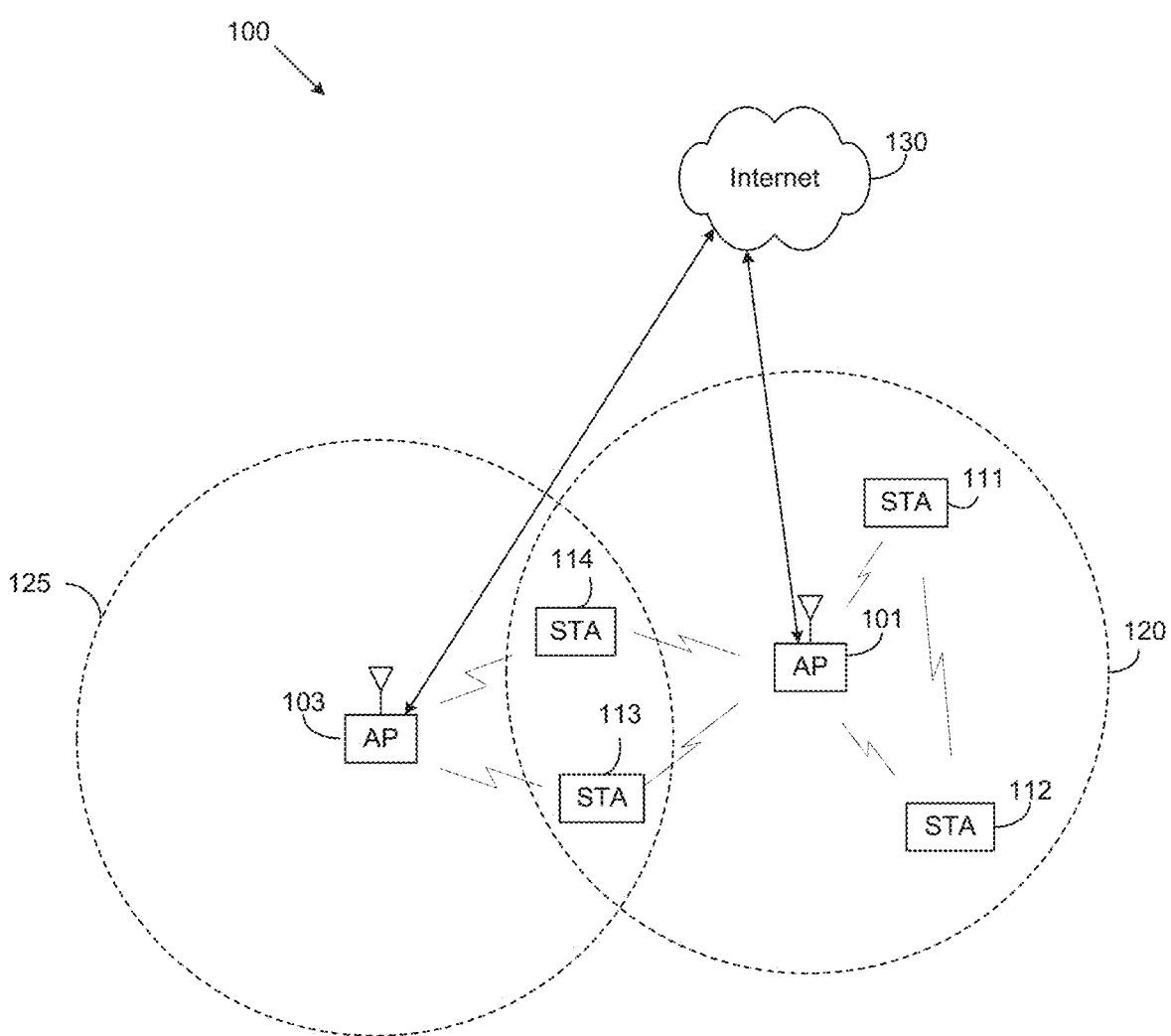
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN (wireless local area network) communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming to enable Wi-Fi based human presence and motion detection. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
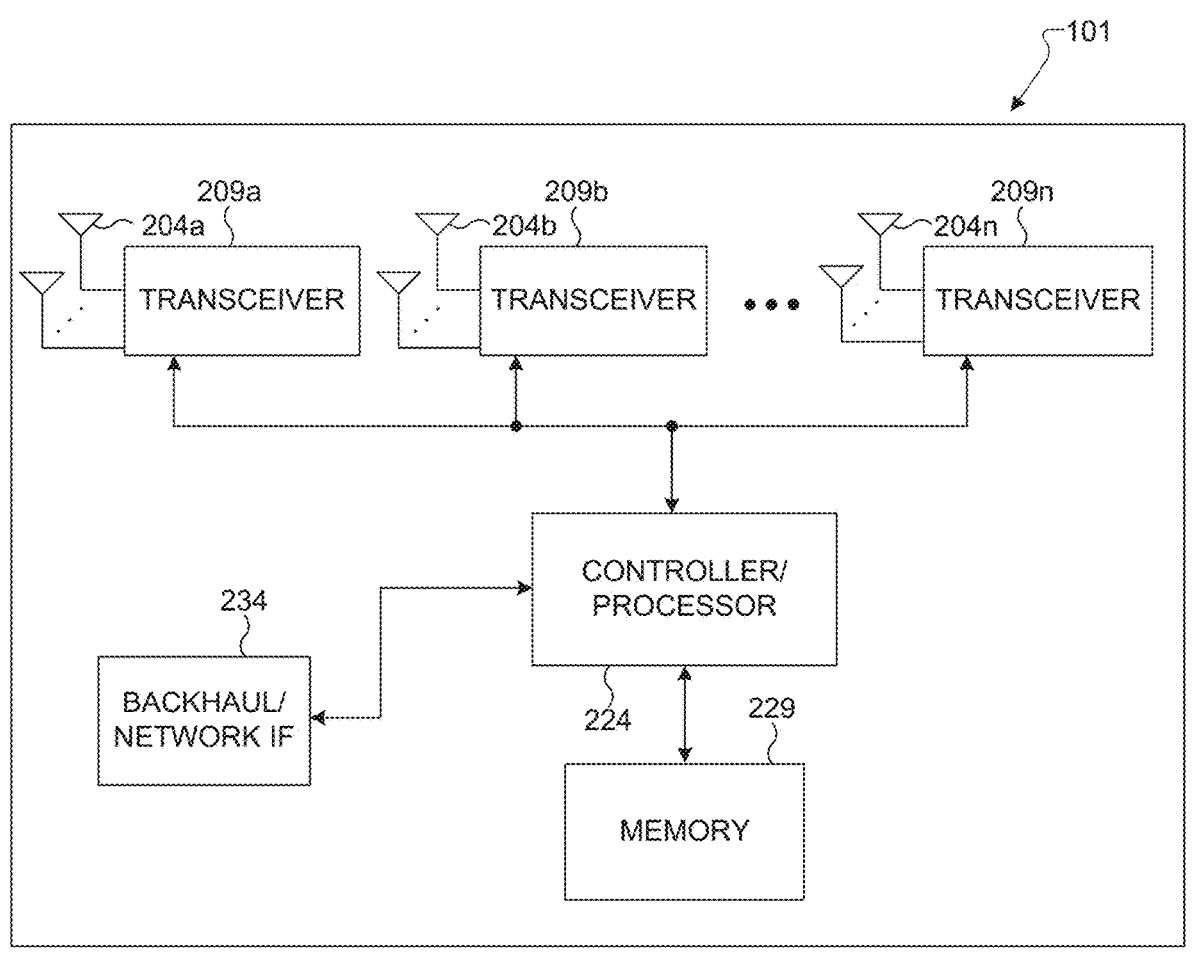
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n and multiple transceivers 209a-209n. The AP 101 also includes a controller/processor 224, a memory 229, and a backhaul or network interface 234. The transceivers 209a-209n receive, from the antennas 204a-204n, incoming radio frequency (RF) signals, such as signals transmitted by STAs 111-114 in the network 100. The transceivers 209a-209n down-convert the incoming RF signals to generate IF or baseband signals. The IF or baseband signals are processed by receive (RX) processing circuitry in the transceivers 209a-209n and/or controller/processor 224, which generates processed baseband signals by filtering, decoding, and/or digitizing the baseband or IF signals. The controller/processor 224 may further process the baseband signals.

Transmit (TX) processing circuitry in the transceivers 209a-209n and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209a-209n up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the transceivers 209a-209n in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including Wi-Fi based human presence and motion detection. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for Wi-Fi based human presence and motion detection. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
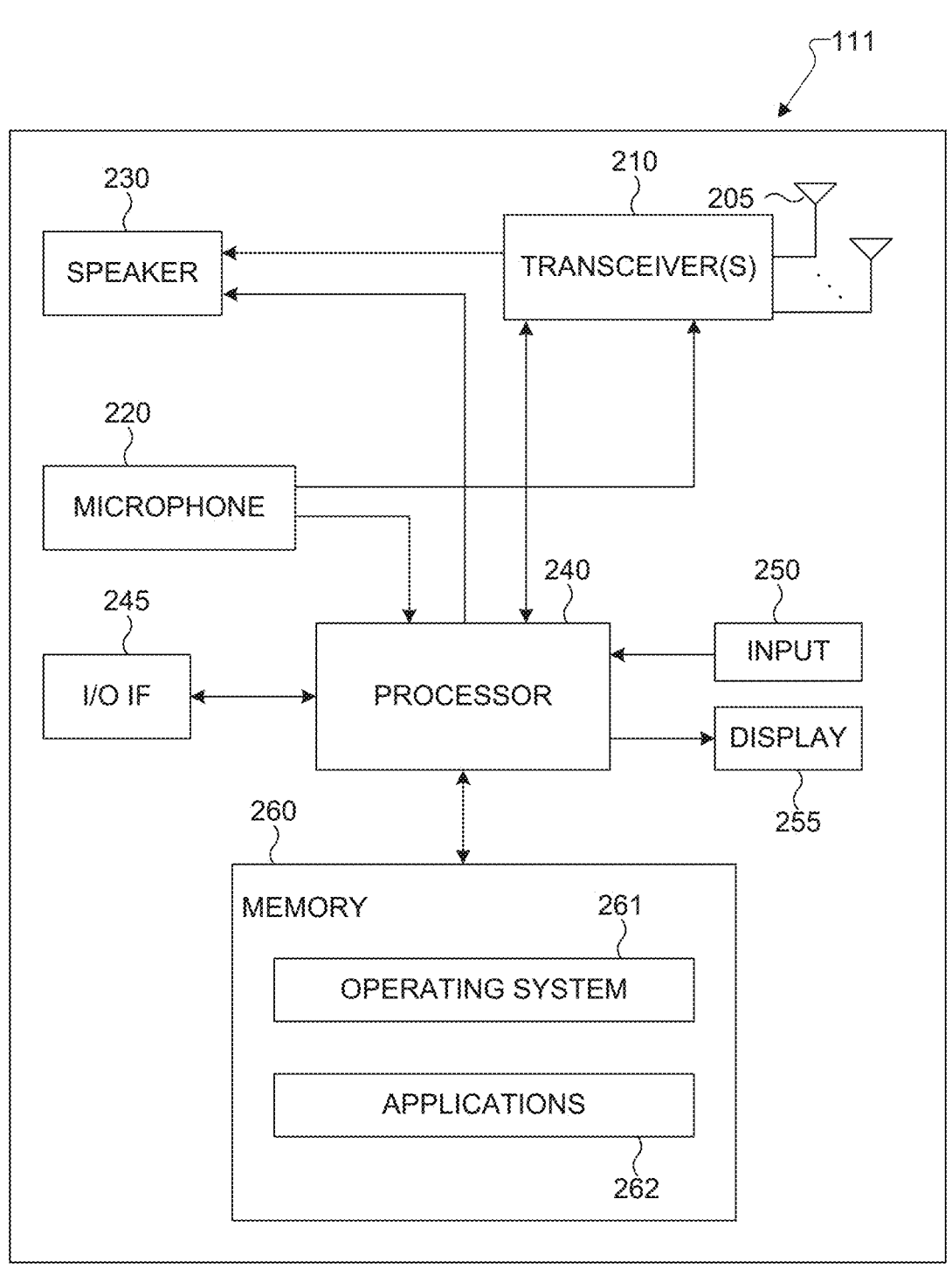
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to enable Wi-Fi based human presence and motion detection. In some embodiments, the processor 240 includes at least one microprocessor or microcontroller.

The processor 240 is also capable of executing other processes and programs resident in the memory 260, such as operations for enabling Wi-Fi based human presence and motion detection. The processor 240 can move data into or out of the memory 260 as required by an executing process. In some embodiments, the processor 240 is configured to execute a plurality of applications 262, such as applications to enable Wi-Fi based human presence and motion detection. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed earlier, presence detection is a useful feature in many current smart home devices. Presence detection provides a foundation for other features such as smart control of lighting, heating, ventilation, and air conditioning. This feature is currently achieved using different modalities, including cameras and infrared (IR) sensors, but each method has its own disadvantages. Wi-Fi is a widely used wireless communication technology that already exists in many smart home devices. Developing methods to utilize existing Wi-Fi signals for presence detection is of great interest to many companies, but current techniques have a number of limitations. To effectively utilize and process the Wi-Fi signals to achieve human presence detection, there are several key challenges which need to be addressed.

First, a Wi-Fi presence detection system needs to have low latency and high accuracy for real applications. However, low latency usually means the observation time window is short, while high accuracy usually requires a relatively long observation window.

Second, when a person is inside a room, it can be difficult for the system to continuously detect the presence of the person if the person remains absolutely still, such as lying on the bed. This can be a challenging problem as typical human motion is missing in this scenario.

Third, the Wi-Fi signal can suffer from severe interference in different sub-bands. How to detect that the Wi-Fi signals are contaminated in certain sub-bands and how to filter out and utilize the clean Wi-Fi signal can be a problem. In addition, RF interference can also cause the Wi-Fi packet to be dropped by the receiver, resulting in large gaps between the Wi-Fi packet and causing the Wi-Fi interpacket time to increase, which would impact the decision threshold of Wi-Fi presence detection.

To address these and other issues, this disclosure provides systems and methods for Wi-Fi based human presence and motion detection. As described in more detail below, the disclosed embodiments perform presence and motion detection using Wi-Fi signals, which can enable presence detection in current smart home devices without any additional cost of new or modified hardware. The disclosed embodiments provide multiple advantageous benefits over conventional systems that perform presence detection. For example, the disclosed embodiments achieve low latency and high accuracy to meet real-world users' need for presence detection. Also, the disclosed embodiments resolve various problems of interference signals to Wi-Fi signals, such as those discussed above.

Note that while some of the embodiments discussed below are described in the context of smart home devices, these are merely examples. It will be understood that the principles of this disclosure may be implemented in any number of other suitable contexts or systems, including other fixed or portable electronic devices (e.g., tablets, laptops, and the like).

Figure 3:
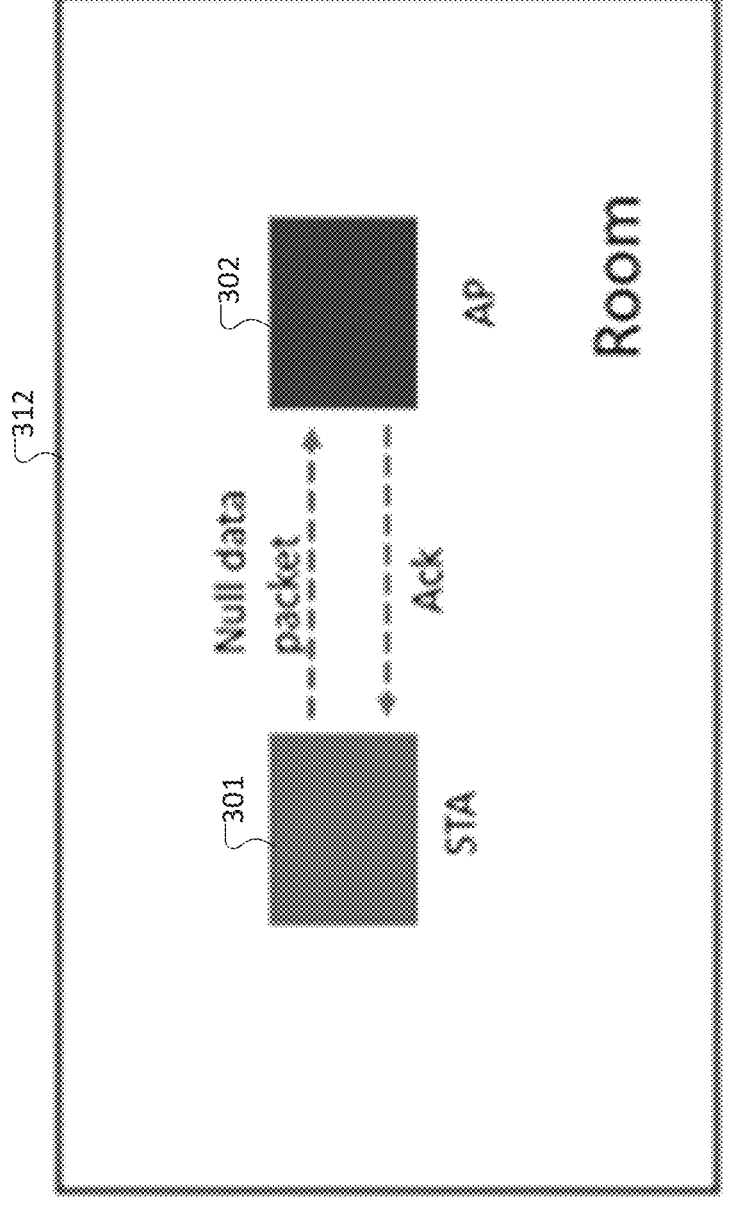
FIG. 3 illustrates an example system in which Wi-Fi CSI data acquisition can be performed according to various embodiments of the present disclosure.

FIG. 3 illustrates an example system 300 in which Wi-Fi Channel State Information (CSI) data acquisition can be performed according to various embodiments of the present disclosure. The embodiment of the system 300 shown in FIG. 3 is for illustration only. Other embodiments of the system 300 could be used without departing from the scope of this disclosure.

As shown in FIG. 3, the system 300 includes a Wi-Fi STA 301 and an AP 302 that communicate over a wireless network. The Wi-Fi STA 301 and the AP 302 are both disposed in a space 312, such as a room. In some embodiments, the Wi-Fi STA 301 can represent (or be represented by) the STA 111 of FIG. 1, and the AP 302 can represent (or be represented by) the AP 101 of FIG. 1.

In Wi-Fi, CSI can be used for sensing applications. To get the CSI information, the STA 301 can send a null data packet to the AP 302, and then the AP 302 can reply to the STA 301 with an Ack packet. Then the STA 301 can extract the CSI from the Ack packet. The CSI can then be used for presence detection. In some embodiments, the periodicity of sending the null data packet and receiving the Ack packet can be from 1 millisecond to 2 seconds (although other periodicity values are possible and within the scope of this disclosure).

Figure 4:
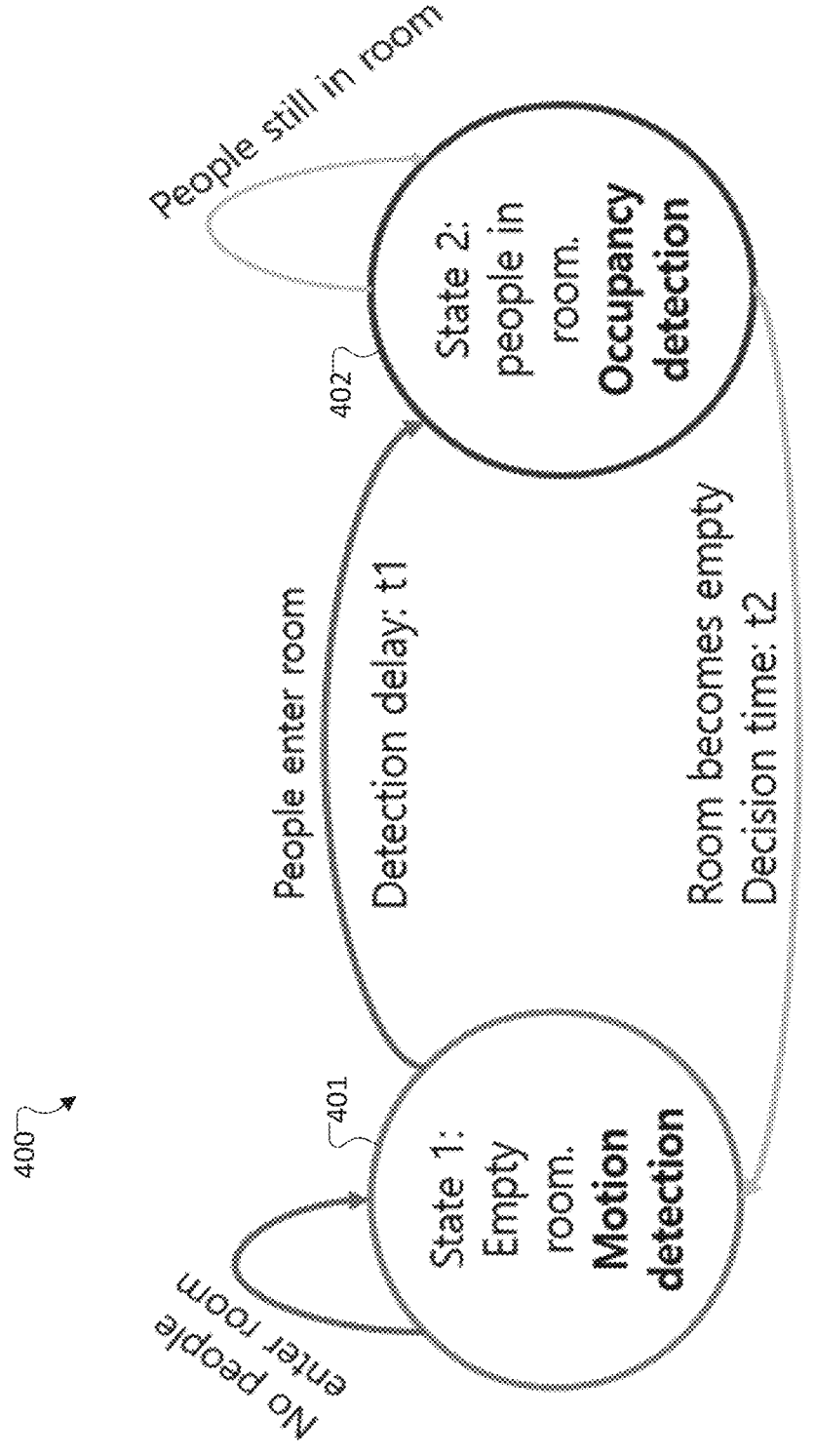
FIG. 4 illustrates an example state machine-based Wi-Fi presence detection system according to various embodiments of the present disclosure.

FIG. 4 illustrates an example state machine-based Wi-Fi presence detection system 400 according to various embodiments of the present disclosure. The embodiment of the system 400 shown in FIG. 4 is for illustration only. Other embodiments of the system 400 could be used without departing from the scope of this disclosure. For ease of explanation, the system 400 will be described as being implemented in the STA 301 of FIG. 3. However, the system 400 could be implemented in any other suitable device or system (such as the AP 302).

As shown in FIG. 4, the system 400 includes a motion detection module 401 and an occupancy detection module 402. As described in greater detail below, the motion detection module 401 can detect for macro-movements (i.e., large motion) of a person in a room (or other space) based on whether macro-movements are present in filtered CSI. The motion detection module 401 can detect with low latency and high accuracy. The occupancy detection module 402 can detect micro-movements (i.e., small movements, such as hand waving, stretching legs, and the like) from the person based on whether micro-movements, breath signals, or both are present in the filtered CSI. The occupancy detection module 402 can detect with high accuracy. The motion detection module 401 and the occupancy detection module 402 are linked together through a dual state-machine architecture to achieve the presence detection function. State 1 corresponds to the motion detection module 401, while State 2 corresponds to the occupancy detection module 402.

When the room is currently empty, the state machine is in State 1 (empty room), and the motion detection module 401 continuously detects for any motion signal with an observation window (i.e., a detection interval) t1. Here, t1 can be a short observation window, such as smaller than 2 seconds. When a motion is detected, the motion detection module 401 can provide an indication that the room is now occupied, and the state machine transitions to State 2 (occupied room). In State 2, the occupancy detection module 402 is activated to detect whether a person is still inside the room with a longer observation window t2. Here, t2 is a longer observation window than t1. In some embodiments, t2 can be 10 to 90 seconds. Of course, other values for t1 and t2 are possible and within the scope of this disclosure. If the occupancy detection module 402 detects that the room is still occupied, then the occupancy detection module 402 can retain the indication that the room is occupied. However, if the occupancy detection module 402 detects that the room is no longer occupied, then the occupancy detection module 402 can provide an indication that the room is no longer occupied.

For the motion detection module 401, the mean or the median of the standard deviation of the CSI amplitude over a time window of t1 can be determined and used as a feature, which can be represented by the following equation:

$$fea_{lmotion} = \text{median}(std_{t1}(A_i))$$

where i is the index of the subcarrier, $A_i$ is the CSI amplitude of the subcarrier i, and $std_{t1}(A_i)$ means the standard deviation of $A_i$ over a time window of t1.

For the occupancy detection module 402, the micro-movements can be detected using the same motion detection feature as above but with a longer observation window t3, where t3 is typically larger than t1 and smaller than t2:

$$fea_{smotion} = \text{median}(std_{t3}(A_i))$$

Besides micro-movements, human breath signals can be computed, such as with a metric BreathSNR or a Respiration Energy Ratio (RER). These will be discussed in greater detail below.

In some embodiments, the raw CSI data can be filtered to eliminate any contaminated CSI data. The CSI filtering can include two stages. The first stage is to filter out the high-peak CSI, and the second stage is to filter out any abnormal CSI. A detailed discussion of CSI filtering is provided below.

FIGS. 5A through 5D illustrate a process 500 for Wi-Fi presence detection according to various embodiments of the present disclosure. The embodiment of the process 500 shown in FIGS. 5A through 5D is for illustration only. Other embodiments of the process 500 could be used without departing from the scope of this disclosure. For ease of explanation, the process 500 will be described as being implemented in the STA 301 of FIG. 3. However, the process 500 could be implemented in any other suitable device or system (such as the AP 302).

Figure 5A:
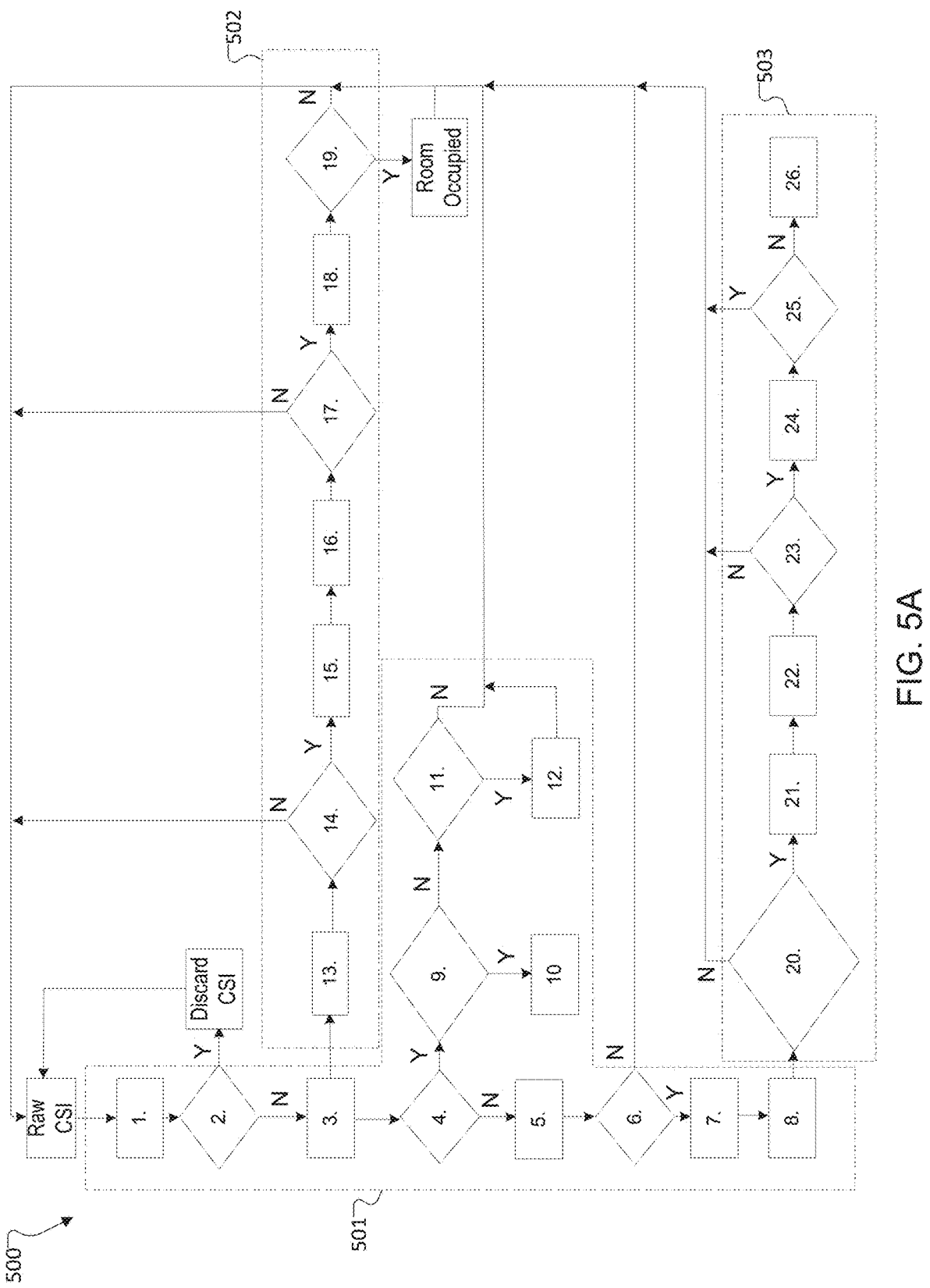
FIGS. 5A through 5D illustrate a process for Wi-Fi presence detection according to various embodiments of the present disclosure.
Figure 5B:
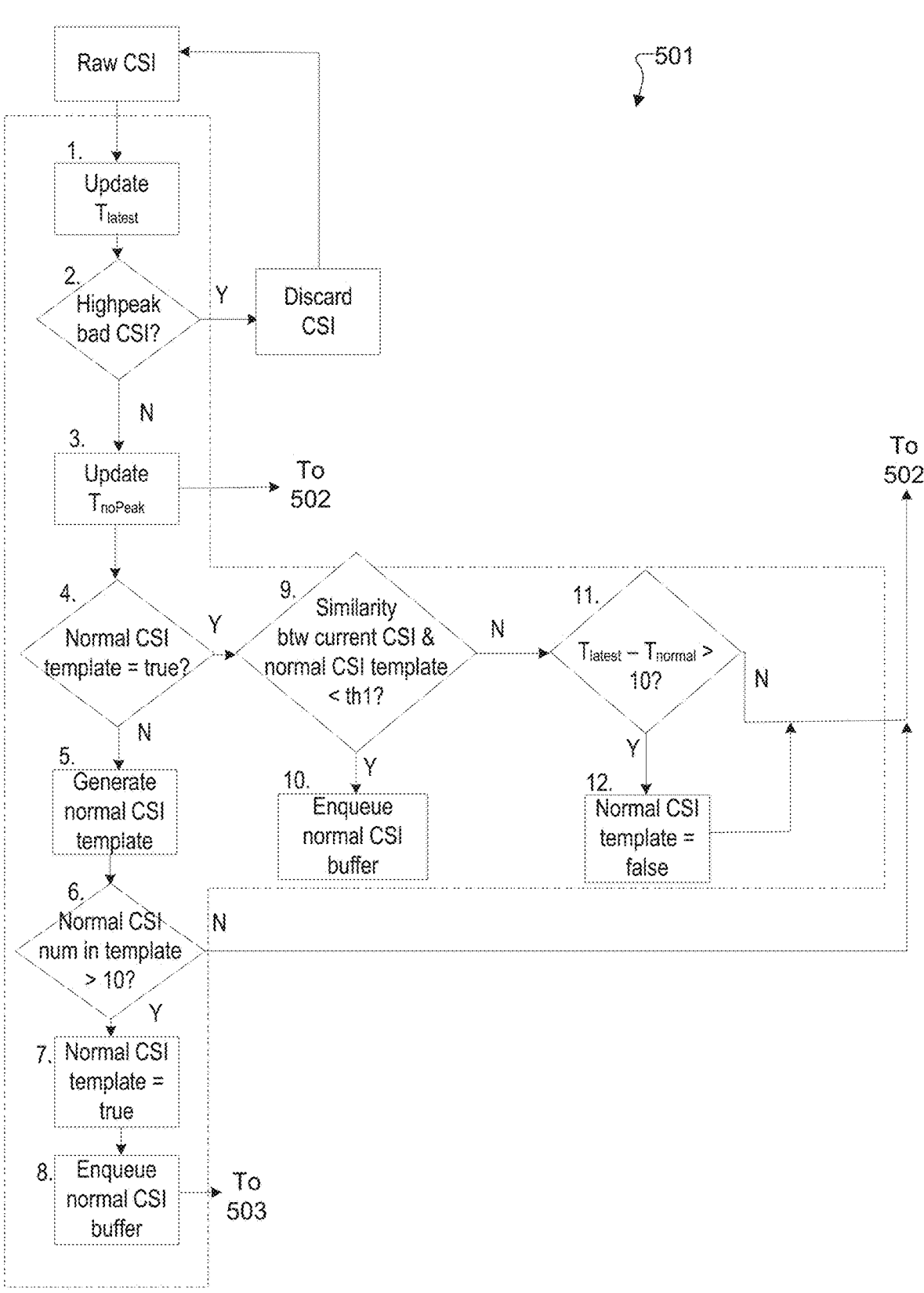
Figures 5C, 5D:
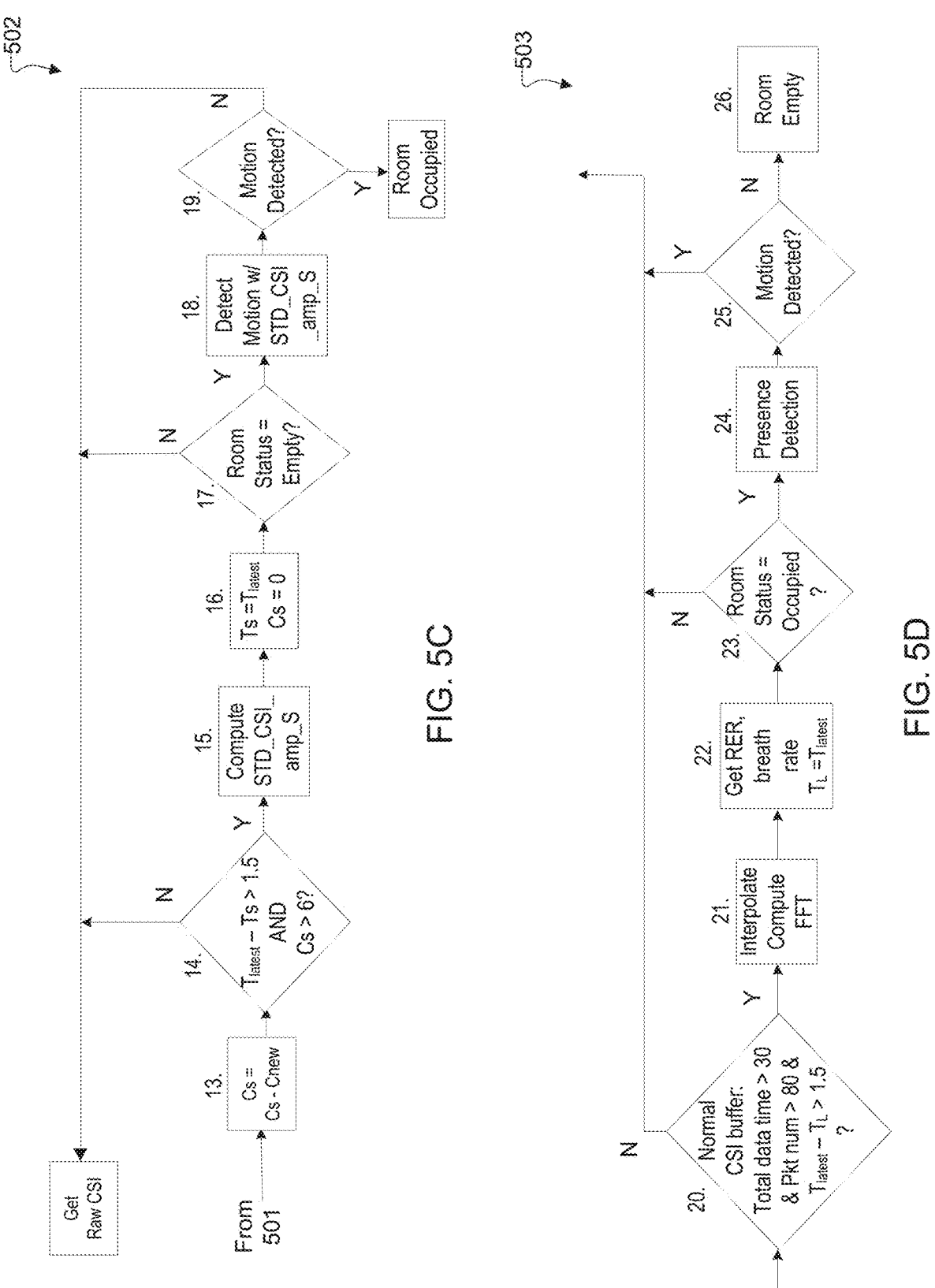

As shown in FIG. 5A, the process 500 includes a CSI filtering routine 501, a motion detection routine 502, and an occupancy detection routine 503. More detailed views of the routines 501-503 are shown in FIGS. 5B through 5D. The CSI filtering routine 501 is performed to filter out bad CSI and accumulate the filtered (or clean) CSI for further processing.

After obtaining raw CSI, the STA 301 gets the latest timestamp of the CSI packet to update $T_{latest}$. Then the STA 301 detects if the current collected CSI contains high peaks, which means that the CSI is corrupted. If high peak CSI is detected, then the current CSI packet is discarded. Otherwise, the STA 301 updates the latest no_highpeak CSI time stamp $T_{noPeak}$ with the current timestamp, and pushes the latest CSI into the NoHighPeakCSI buffer. Then the STA 301 can move to the motion detection routine 502.

Meanwhile, the STA 301 can continue to check if a normal_CSI_template is already built. If there is no normal_CSI_template, then the STA 301 can use an algorithm (such as DBSCAN) to separate the normal CSI into a cluster and add them to the normal_CSI_template. If the number of normal CSI in the template is more than 10, then the normal_CSI_template flag is set to true, which means the normal CSI template is created. Then the STA 301 enqueues all the normal CSI in the normal_CSI_template into the normal CSI buffer and updates the latest normal CSI time $T_{normal}$ to be the latest CSI packet time $T_{latest}$. After the normal_CSI_template is created, the new nohighpeak CSI is compared with the normal_CSI_template to determine whether it is similar enough to be a normal CSI. If so, the new CSI is pushed to the queue of normal CSI buffer and the normal CSI time is updated. If the CSI is not similar to the normal_CSI_template, then the STA 301 checks if the difference between the current time $T_{latest}$ and the last normal CSI time $T_{normal}$ is larger than 10 seconds. If so, then the normal_CSI_template is obsolete and the normal_CSI_template flag is set to false.

The motion detection routine 502 is performed to detect macro-movements and change the room status to occupied if the current room status is empty. If a new nohighpeak CSI is detected, then the current total nohighpeak CSI number $C_s$ is updated. If the current time $T_{latest}$ is more than 1.5 seconds larger than the last time that the motion detection decision is made $(T_s)$ and the current nohighpeak CSI number is larger than 6, then the standard deviation of the nohighpeak CSI in the buffer is computed, the $T_s$ is set to $T_{last}$, and the $C_s$ is reset to zero. If the current room status is empty, then the STA 301 checks if the standard deviation of the nohighpeak CSI STD_CSI_amp_S is larger than a threshold to determine if motion is detected. If motion is detected, then room status is set to occupied.

The occupancy detection routine 503 utilizes the detection of micro-movements and human vital signals (such as breathing) to determine if the current room is occupied. The occupancy detection routine 503 is operable if the current room status is occupied, and it will change the room status to be empty if no motion or human vital signal is detected. The STA 301 first checks three conditions: (1) if the normal CSI buffer has accumulated data more than 30 seconds, (2) if the buffer has accumulated more than 80 packets in the last 30 seconds, and (3) if the current time $T_{latest}$ is more than 1.5 seconds larger than Ty, which is the last time that a breath signal is detected. If all three conditions are satisfied, then the STA 301 interpolates the CSI of each subcarrier in the time domain. Then the STA 301 computes the RER of the breath signal as well as the standard deviation of the CSI amplitude STD_CSI_amp_L and resets $T_L$ to be $T_{lastest}$. If the current room status is occupied, then the STA 301 uses the statistics of the RER and STD_CSI_amp_L with either heuristic or machine learning methods (as described in greater detail below) to determine if there is motion. If no motion is detected, then the room status is changed to empty.

For the occupancy detection, it is important to detect the presence of a person, even while that person may remain absolutely still inside the room. Thus, the following describes a process for human occupancy detection in which human breathing signals are detected, which are present while a person is inside of the room. For example, the breath signals can be estimated from the spectrum of the amplitude of the CSI.

Figure 6:
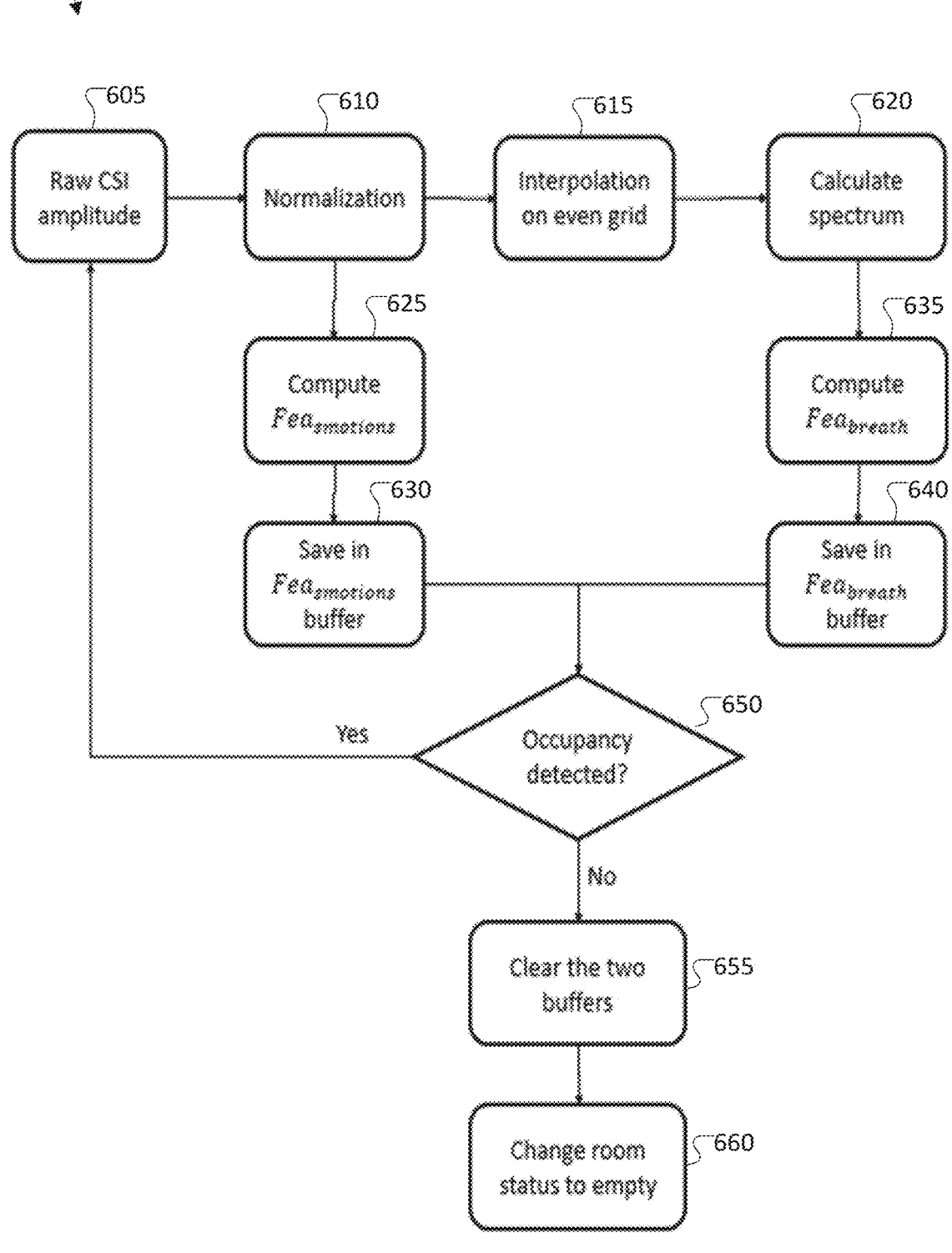
FIG. 6 illustrates an example process for human occupancy detection according to various embodiments of the present disclosure.

FIG. 6 illustrates an example process 600 for human occupancy detection according to various embodiments of the present disclosure. The embodiment of the process 600 shown in FIG. 6 is for illustration only. Other embodiments of the process 600 could be used without departing from the scope of this disclosure. In some embodiments, the process 600 can be a part of the occupancy detection module 402, the occupancy detection routine 503, or both. For ease of explanation, the process 600 will be described as being implemented in the STA 301 of FIG. 3. However, the process 600 could be implemented in any other suitable device or system (such as the AP 302).

The STA 301 can perform the process 600 to detect the presence of one or more persons inside of a room. The process 600 combines the detection of small motion (such as waving hands, kicking legs, and the like) and micro-motion (such as human breathing) to decide the occupancy status of the room. As discussed in greater detail below, the process 600 extracts Wi-Fi signal features for micro-movements and breath signal detection, and then extracts the statistics from the micro-movements and breath features and forms a time-series feature. Then, a heuristic or machine-learning based approach can be used with the time-series feature to detect occupancy.

As shown in FIG. 6, the process 600 starts with operation 605, in which the STA 301 obtains the raw CSI amplitude. At operation 610, the STA 301 normalizes the raw CSI amplitude with the overall packet power computed across the subcarrier to cancel out the impact of Automatic Gain Control (AGC) compensation. The normalization can be described by the equation shown below, where $CSI_i$ is the CSI of the ith subcarrier:

$$CSI_i = \frac{CSI_i}{\sqrt{\sum (CSI_i)^2}}$$

The AGC will increase/decrease the amplitude of the CSI based on whether the received packet power is too weak/strong. If the CSI is normalized with the overall packet power after AGC, then the impact of AGC can be minimized.

At operation 615, in the time domain, the STA 301 performs linear interpolation to CSI amplitude data to get uniform data samples in time. At operation 620, the STA 301 calculates the spectrum.

At operation 625, the STA 301 computes the small motion feature $Fea_{smotion}$ (defined above), and at operation 630, the STA 301 saves the small motion feature $Fea_{smotion}$ in a buffer. At operation 635, the STA 301 computes a breath signal feature $fea_{breath}$ as described below to estimate the breath energy, and at operation 640, the STA 301 saves the breath signal feature $fea_{breath}$ in a buffer. In some embodiments, the size of the FIFO $Fea_{smotion}$ buffer and the size of FIFO $Fea_{breath}$ buffer are M1, although other sizes are possible.

There are four Wi-Fi signal features that the STA 301 can use to extract the feature $fea_{breath}$. Each feature below is calculated over a time window of t2 on each subcarrier's CSI amplitude.

The breathSNR feature is defined as the ratio between the breath energy and the noise energy. The breath frequency is typically between 8 and 30 breaths per minute. From the spectrum of the amplitude of the CSI, within the breath frequency range, the STA 301 can find the peak value of the spectrum which is used to represent the breath energy. Here, the noise frequency range is defined as the frequency range between the max breath frequency to the half of the inverse of the average inter-packet time. Then the STA 301 calculates the average noise energy by taking the average energy in the noise frequency range, as in the following equation:

$$breathSNR = \frac{peak\ energy\ in\ breath\ frequency\ range}{average\ noise\ energy}$$

The respiration energy ratio (RER) is defined as the ratio of the peak energy within the breath frequency range to the total energy within the breath frequency range:

$$RER = \frac{peak\ energy\ in\ breath\ freqeuncy\ range}{total\ energy\ within\ breath\ frequency\ range}$$

The breath peak prominence ratio is defined as the ratio between the prominence of the largest prominence peak within the breath frequency range to the average prominence of the top N largest prominence peaks in the noise frequency range, where a typical value of N is larger than 2:

$$breath\ peak\ prominence\ ratio = \frac{prominence\ of\ largest\ promienece\ peak\ within\ breath\ frequency}{average\ prominence\ of\ N\ largest\ prominence\ peak\ in\ noise\ freq\ range}$$

The differential prominence ratio is defined as the ratio between the difference of breath peak prominence and noise peak prominence and the average difference between noise peaks' prominence:

$$differential\ peak\ prominence\ ratio = \frac{diff(breath\ peak\ prominence,\ average\ noise\ peak\ prominence)}{mean(abs(diff(noise\ peaks'\ prominence)))}$$

The overall breath signal feature is defined as:

$$fea_{breath} = median(breathFea)$$

where breathFea can be any of the four breath signal features defined above, and the median operation is taken across all subcarriers.

By combining the $fea_{smotion}$ and $fea_{breath}$, the occupancy status of the room can be determined. At operation 650, the STA 301 determines if occupancy is detected in the room. For a heuristic method based occupancy detection, the STA 301 can use the two criteria below to determine whether human occupancy is detected.

Criteria 1: If the $Fea_{smotions}$ and $Fea_{breath}$ buffer has at least the last My data points and there are more than M2 number of data points where $Fea_{smotions}$ is smaller than $thresh_{smotions}$ and $Fea_{breath}$ is smaller than $thresh_{breath}$.

Criteria 2: If the $Fea_{smotions}$ and $Fea_{breath}$ buffer has at least the last M1 data points and there are more than M3 consecutive data points that $Fea_{smotions}$ is smaller than $thresh_{smotions}$ and $Fea_{breath}$ is smaller than $thresh_{breath}$.

In Criteria 1 and Criteria 2, example values for M1 can be integers between 10 and 20 inclusive. Exemplary values for M2 can be integers between 7 and 19 inclusive. Example values for M3 can be integers between 3 and 10 inclusive.

If either Criteria 1 or Criteria 2 is satisfied, then the STA 301 determines that occupancy is not detected, and then clears the two buffers (operation 655) and changes the room status to empty (operation 660).

Besides the heuristic method described above, a machine learning-based method can also be used to determine room occupancy status. The input to the machine learning model can be snapshot features or time-series features, which are defined below.

For snapshot features, at every snapshot, a series of Wi-Fi signal features can be determined as follows:

$$fea_{snapshot} = [fea_{smotions},\ median(breathFea),\ mean(breathFea),\ var(breathRate)]]$$

Figure 7:
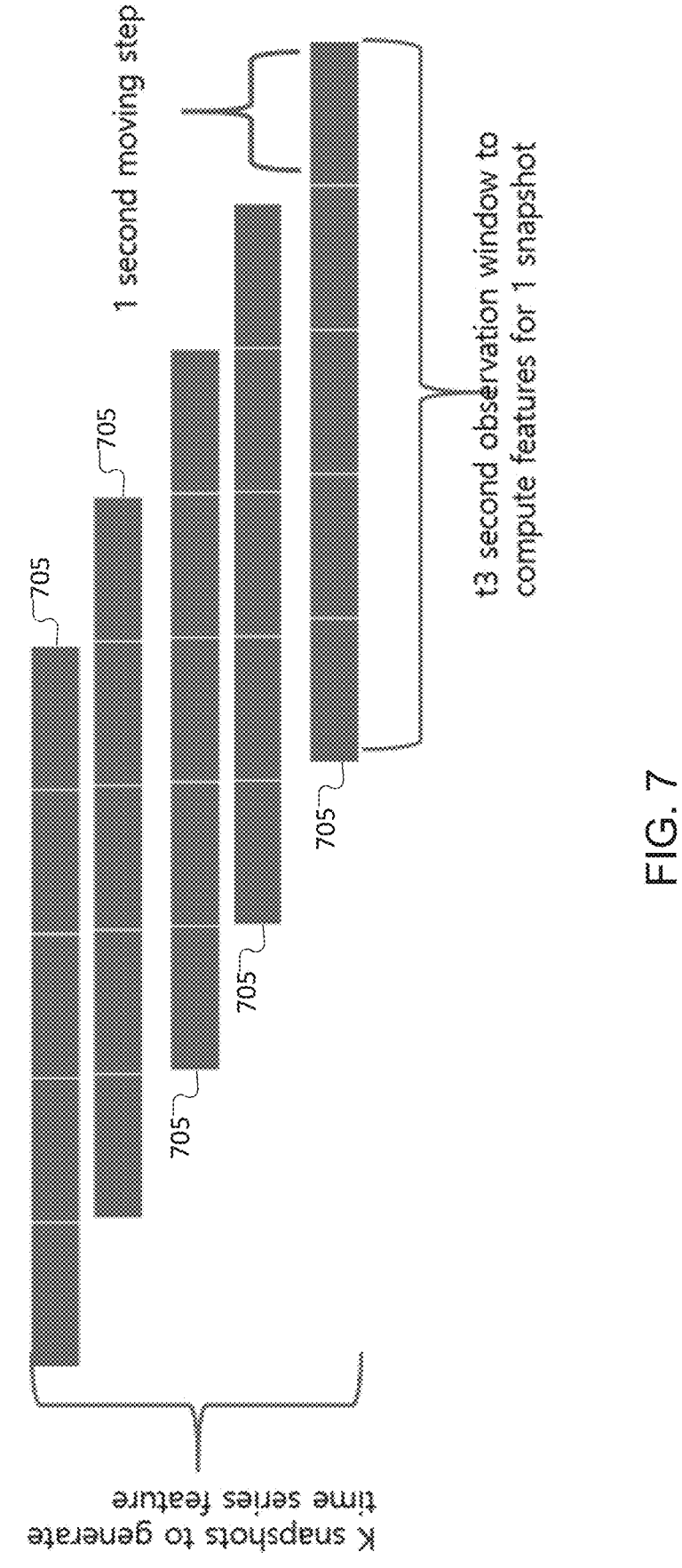
FIG. 7 illustrates an example moving observation window for generating snapshot features according to various embodiments of the present disclosure.

The median, mean, and variance are calculated along the subcarriers. The small motions features are computed from the last t3 seconds, and the other breath signal features are computed from the last t2 seconds according to a moving observation window. FIG. 7 illustrates an example moving observation window 700 for generating snapshot features according to various embodiments of the present disclosure. As shown in FIG. 7, multiple (K) observation time windows 705 can be extracted as K snapshots to generate time-series features. Each observation time window 705 can have a duration of t3 (for small motion features) or t2 (for breath features). Each observation time window 705 is a FIFO buffer, which is updated every 1 second. Thus, new snapshot features can be generated every 1 second.

To generate the time-series features, the K number of snapshot features are recorded. For example, 5 snapshots of $Fea_{smotions}$ can be recorded as:

$$Fea_{smotions}^{snapshots} = [fea_{smotions}^{snapshot1},\ fea_{smotions}^{snapshot2},\ fea_{smotions}^{snapshot3},\ fea_{smotions}^{snapshot4},\ fea_{smotions}^{snapshot5}]$$

Then the time-series features of $Fea_{smotions}$ can be computed as:

$$Fea_{smotions}^{timeseries} = [max(Fea_{smotions}^{snapshots}),\ min(Fea_{smotions}^{snapshots}),\ var(Fea_{smotions}^{snapshots}),\ mean(Fea_{smotions}^{snapshots})]$$

where the max, min, var, mean operations are performed along a time series of snapshots.

The STA 301 can use either the snapshots feature or the time-series feature to feed into the machine learning model (such as a XGBoost model or a random forest model) and then train the machine learning model to perform room occupancy detection.

It is noted that, in environments with RF interference, the Wi-Fi CSI can be contaminated by the interference signal, which can result in false presence detection. Also, in environments with RF interference, Wi-Fi packets can be dropped, thus impacting the human presence detection threshold. Therefore, it is helpful to process the raw CSI data in order to detect and filter the RF interference in each subband of CSI.

To filter the contaminated Wi-Fi signal and fully utilize the clean Wi-Fi signal in each subband, the STA 301 can use a sub-band based Wi-Fi signal filtering method that utilizes the abnormal high peaks in the Wi-Fi subcarrier domain to filter out contaminated Wi-Fi signals in each sub-band. In addition, the STA 301 can implement an inter-packet time-based adaptive thresholding system to combat the impact of lost Wi-Fi packets to the presence detection threshold.

Figure 8:
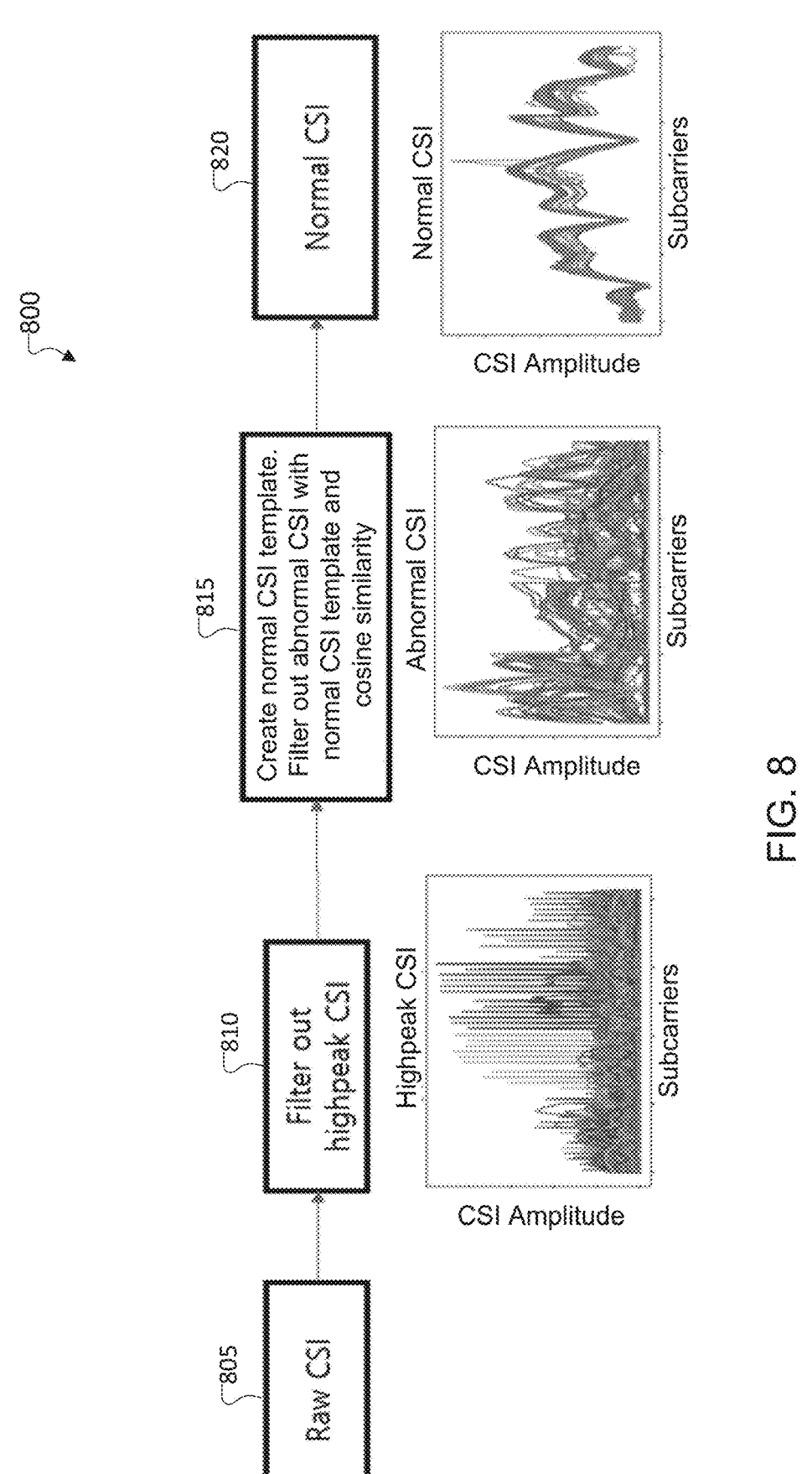
FIG. 8 illustrates an example process for sub-band based CSI filtering according to various embodiments of the present disclosure.

FIG. 8 illustrates an example process 800 for sub-band based CSI filtering according to various embodiments of the present disclosure. The embodiment of the process 800 shown in FIG. 8 is for illustration only. Other embodiments of the process 800 could be used without departing from the scope of this disclosure. For ease of explanation, the process 800 will be described as being implemented in the STA 301 of FIG. 3. However, the process 800 could be implemented in any other suitable device or system (such as the AP 302).

As shown in FIG. 8, at operation 805, the STA 301 obtains the raw CSI. The raw CSI usually contains highpeak CSI which is the contaminated CSI. At operation 810, the STA 301 filters out the highpeak CSI using any suitable filtering technique. After filtering out the highpeak CSI, at operation 815, the STA 301 creates a normal CSI template. In some embodiments, the STA 301 classifies the CSI based on their cosine distances, and selects the cluster with the largest number of CSI as the normal CSI template. Then, the STA 301 compares the new CSI with the mean of the CSI template using the cosine distance metric to filter out the abnormal CSI, resulting in normal CSI 820.

To filter out the highpeak CSI (operation 810) and the abnormal CSI (operation 815), while preserving the most amount of useful information, the STA 301 can use a subband based CSI filtering method. As one example method, the Wi-Fi CSI can be broken down into several CSI sub-bands, each having a bandwidth of, e.g., 20 MHz . . . . On each 20 MHz sub-band, the STA 301 checks three metrics on the CSI amplitude across subcarriers.

1. Number of peaks NumPeaks in CSI amplitude across 20 MHz.
2. Number of highpeaks NumHighPeaks in CSI amplitude across 20 MHz. Here, a highpeak is defined as the peak value which exceeds a threshold $Th_{peak}$.
3.

$$PeakProminenceRatio = \frac{Peak_{max} - Peak_{mean}}{Peak_{mean}}.$$

The 20 MHz sub-band CSI is considered to be contaminated and be a highpeak CSI if any of the following three conditions is met.

1. NumPeaks>P1.
2. NumHighPeaks>P2.
3. PeakProminenceRatio>P3.

Here, P1, P2, and P3 are predetermined threshold values. Then for the entire used band for CSI, if all 20 MHz sub-bands are not highpeak CSI, then the CSI of the entire used band are not high peak CSI. Here, the CSI that are not high peak CSI are referred to as nohighpeak CSI.

Figure 9A:
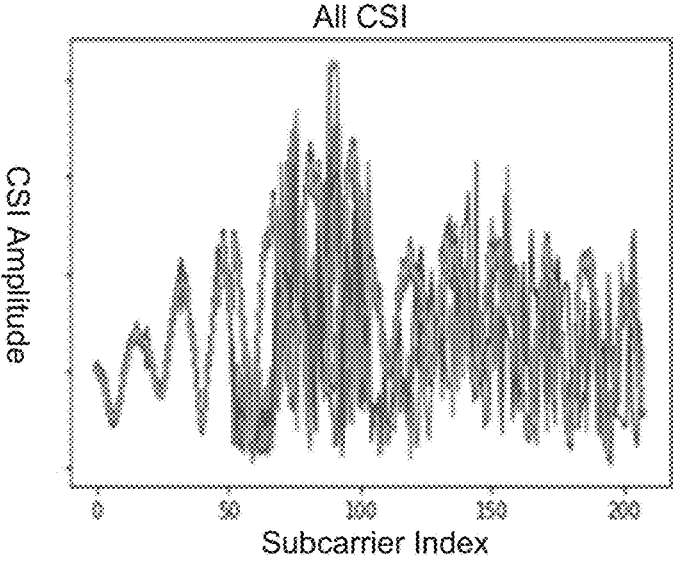
FIGS. 9A through 9C illustrate example filtering results using CSI subband filtering according to various embodiments of the present disclosure.
Figure 9B:
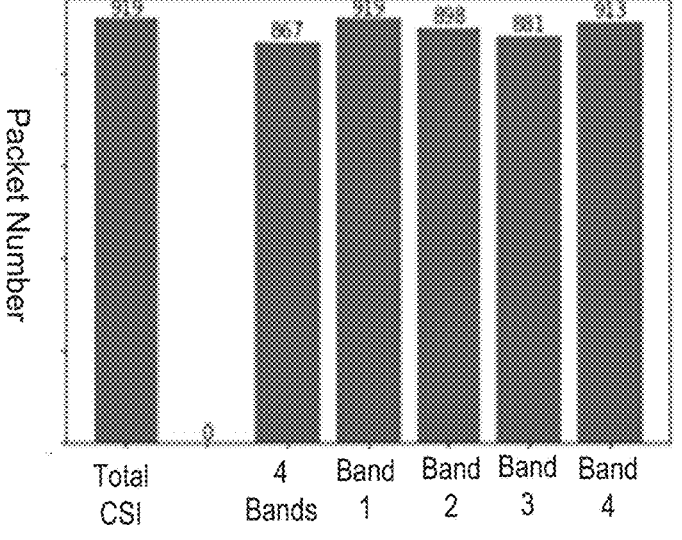
Figure 9C:
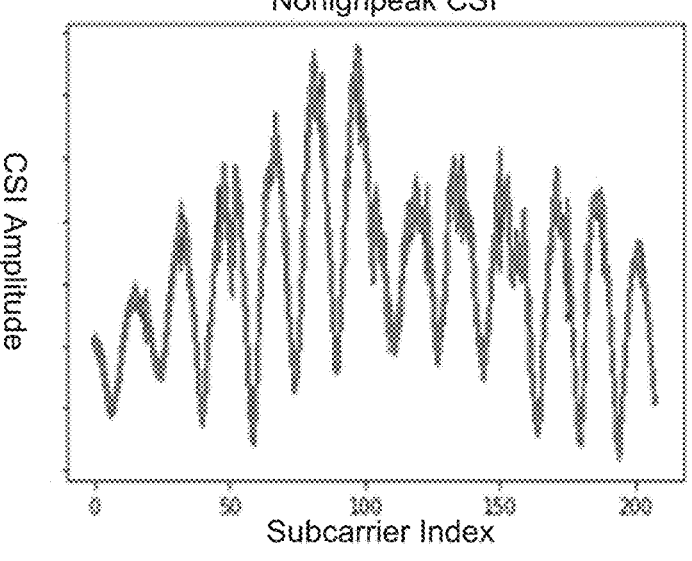

FIGS. 9A through 9C illustrate example filtering results using CSI subband filtering according to various embodiments of the present disclosure. FIG. 9A depicts raw CSI. FIG. 9B shows the number of nohighpeak CSI after filtering for the entire 80 MHz band and each 20 MHz band. FIG. 9C depicts the filtered nohighpeak CSI over the 80 Mhz bandwidth, which represents the final filtering result. Compared with filtering over the entire 80 MHz bandwidth in one step, filtering CSI on each 20 MHz bandwidth and then finding the nohighpeak CSI over the entire bandwidth can significantly increase the number of usable CSI.

Figure 10:
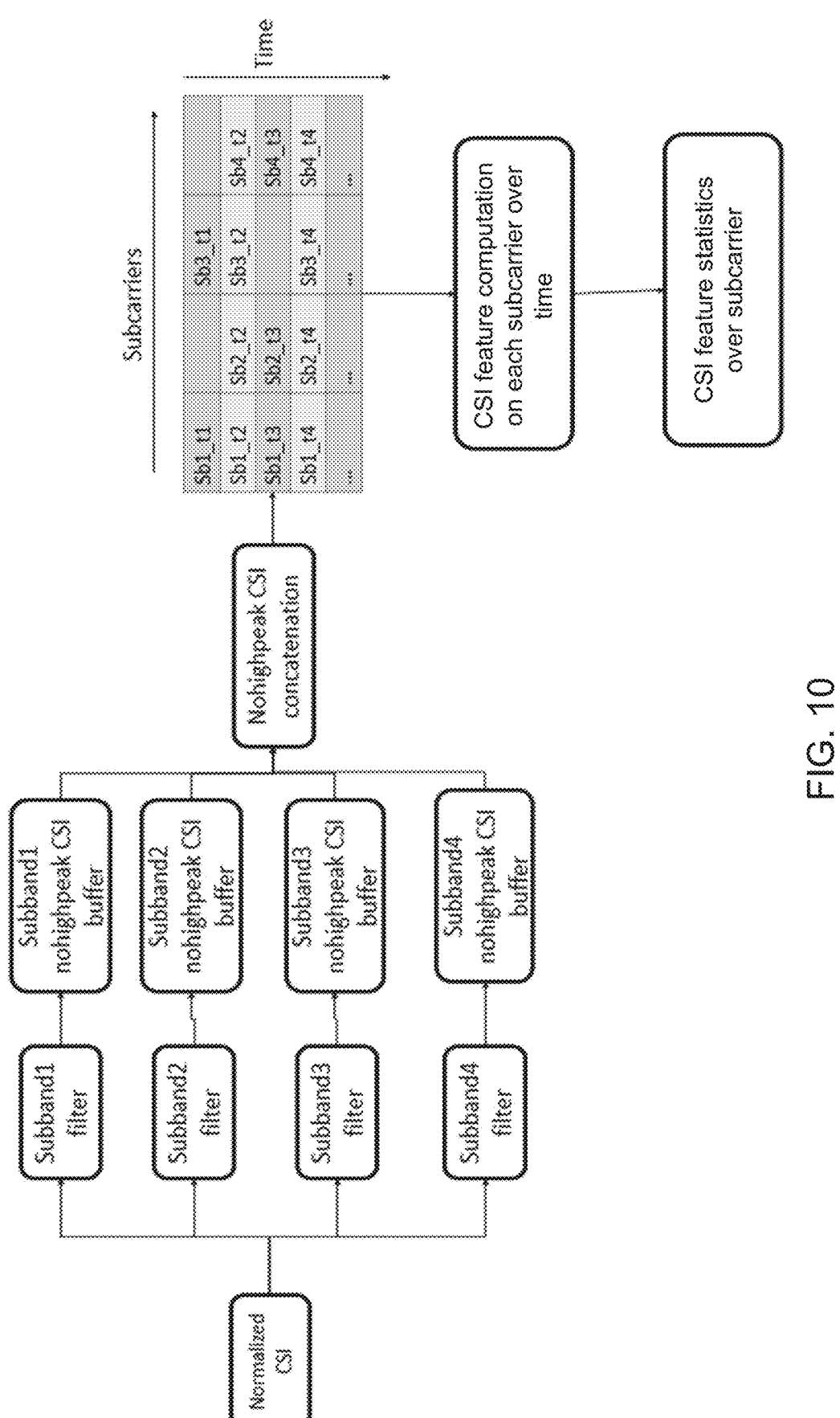
FIG. 10 illustrates an example technique for sub-band based CSI filtering according to various embodiments of the present disclosure.

In some embodiments, to maximize the utilization of nohighpeak CSI, the CSI are first filtered in each subband using the conditions above, and then the nohighpeak CSI of each subband are stored in their corresponding buffer separately. Then the CSI features over each subcarrier are computed separately over time. Finally, the computed CSI features are combined across subcarriers via median or mean operation. A representative example of this technique is shown in FIG. 10.

As discussed above, the RF interference can also cause CSI packets to be lost or dropped. Thus, the threshold for breath signal detection or motion detection can be affected. Accordingly, in some embodiments, the STA 301 can use a linear adaptive thresholding method to dynamically change the detection threshold based on an average inter-packet time, such as shown in the following:

$$FeatureTH_{adapt} = FeatureTH_{ori} + (\text{mean}(interpktTime) - \alpha) * \beta$$

where $\alpha$ and $\beta$ are heuristic parameters, which are acquired through a regression of the best threshold to use for each inter-packet time (interpktTime).

Although FIGS. 3 through 10 illustrate example techniques for Wi-Fi based human presence and motion detection and related details, various changes may be made to FIGS. 3 through 10. For example, various components in FIGS. 3 through 10 could be combined, further subdivided, or omitted and additional components could be added according to particular needs. In addition, while shown as a series of steps, various operations in FIGS. 3 through 10 could overlap, occur in parallel, occur in a different order, or occur any number of times. In another example, steps may be omitted or replaced by other steps.

Figure 11:
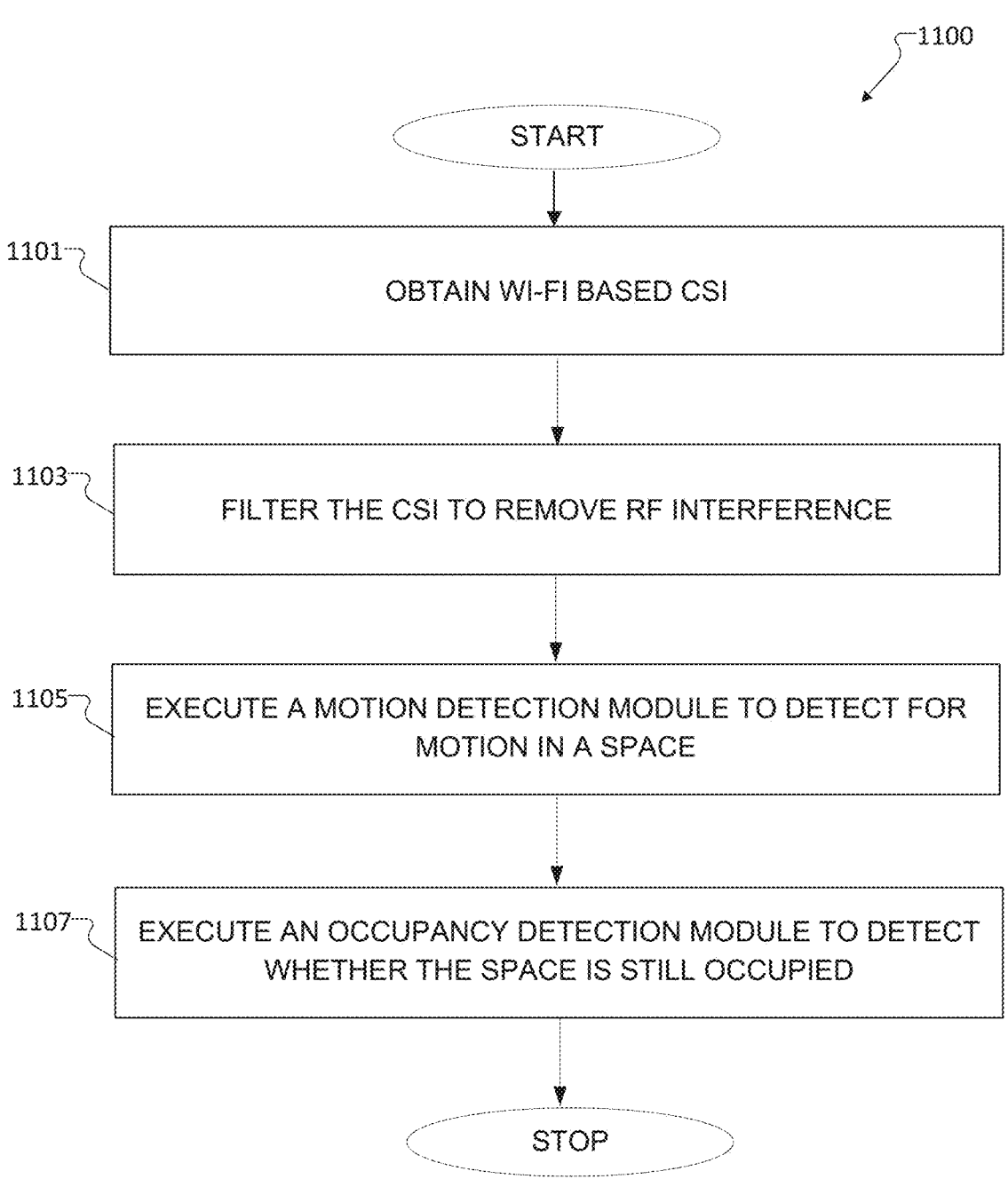
FIG. 11 illustrates a flow chart of a method for Wi-Fi based human presence and motion detection according to various embodiments of the present disclosure.

FIG. 11 illustrates a flow chart of a method 1100 for Wi-Fi based human presence and motion detection according to various embodiments of the present disclosure, as may be performed by one or more components of the system 300 (e.g., the STA 301 or the AP 302). The embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1101. At step 1101, the STA 301 obtains Wi-Fi based CSI. This could include, for example, the STA 301 extracting the CSI from an Ack packet, such as shown in FIG. 3.

At step 1103, the STA 301 filters the CSI to remove RF interference. This could include, for example, the STA 301 filtering the CSI using the filtering techniques disclosed above. In some embodiments, the STA 301 can filter the CSI by dividing a Wi-Fi spectrum of the CSI into sub-bands; for each sub-band, determining a number of peaks, a number of high peaks, and a peak prominence ratio; and filtering out the CSI in response to determining that any of the number of peaks, the number of high peaks, or the peak prominence ratio exceeds a corresponding threshold for any sub-band.

At step 1105, the STA 301 executes a motion detection module. The motion detection module determines whether the macro-movements are present in the filtered CSI, detects for motion in a space based on whether macro-movements are present in the filtered CSI, and provides an indication that the space is occupied upon detecting motion in the space. The motion detection module detects for motion during a first observation window. This could include, for example, the STA 301 executing the motion detection module 401, such as shown in FIG. 4.

In some embodiments, the motion detection module can determine whether the macro-movements are present in the filtered CSI by determining a standard deviation of the filtered CSI over the first observation window for each subcarrier in a Wi-Fi spectrum, determining a median value of the standard deviations over all subcarriers in the Wi-Fi spectrum, and determining whether the macro-movements are present in the filtered CSI based on the median value of the standard deviations over all subcarriers.

At step 1107, in response to the indication that the space is occupied, the STA 301 executes an occupancy detection module. The occupancy detection module detects whether the space is still occupied based on whether micro-movements and breath signals are present in the filtered CSI, retains the indication that the space is occupied upon detecting that the space is still occupied, and provides an indication that the space is not occupied upon detecting that the space is no longer occupied. The occupancy detection module detects for motion during a second observation window, the second observation window being longer than the first observation window. This could include, for example, the STA 301 executing the occupancy detection module 402, such as shown in FIG. 4.

In some embodiments, the occupancy detection module can determine whether the micro-movements and the breath signals are present in the filtered CSI by determining a standard deviation of the filtered CSI over a third observation window for each subcarrier in a Wi-Fi spectrum, wherein the third observation window is longer than the first observation window and shorter than the second observation window; determining a median value of the standard deviations over all subcarriers in the Wi-Fi spectrum; determining one or more indicators of breathing based on energy of the filtered CSI over a given range of frequencies and over the second observation window; determining a feature vector based on the median value of the standard deviations over all subcarriers and the one or more indicators of breathing; and determining, based on the feature vector and using a machine learning model, whether small movements and breath signals are present in the filtered CSI.

Although FIG. 11 illustrates one example of a method 1100 for Wi-Fi based human presence and motion detection, various changes may be made to FIG. 11. For example, while shown as a series of steps, various steps in FIG. 11 could overlap, occur in parallel, occur in a different order, or occur any number of times.

The embodiments described herein can be implemented in a wide variety of use cases. For example, the disclosed embodiments can be used for room-level presence detection using a single hub device that is placed inside a room. As another example, the disclosed embodiments can be used for smart home automation with presence detection. For example, a device could automatically turn on (or off) a light, a television, or the like, when a person enters (or leaves) the room. As yet another example, the disclosed embodiments can be used for home security monitoring (e.g., detect intruders into the home) or infant sleep monitoring (e.g., detect the breath signal for a sleeping infant sleep in the room, and if the breath signal becomes weak, trigger an alert). As still another example, the disclosed embodiments can be used in home localization, such as to detect the location of a person based on the occupancy status of each room.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining wireless fidelity (Wi-Fi) based channel state information (CSI);
filtering the CSI to remove radio frequency (RF) interference;
executing a motion detection module comprising:
  detecting for motion in a space based on whether macro-movements are present in the filtered CSI; and
  providing an indication that the space is occupied upon detecting motion in the space,
  wherein the motion detection module detects for motion during a first observation window; and
in response to the indication that the space is occupied, executing an occupancy detection module comprising:
  detecting whether the space is still occupied based on whether micro-movements and breath signals are present in the filtered CSI;
  retaining the indication that the space is occupied upon detecting that the space is still occupied; and
  providing an indication that the space is not occupied upon detecting that the space is no longer occupied,
  wherein the occupancy detection module detects for motion during a second observation window, the second observation window being longer than the first observation window.

2. The method of claim 1, wherein:
the first observation window is less than 2 seconds in duration, and
the second observation window is between 10 seconds and 90 seconds in duration.

3. The method of claim 1, wherein executing the motion detection module further comprises:
determining whether the macro-movements are present in the filtered CSI, comprising:
  determining a standard deviation of the filtered CSI over the first observation window for each subcarrier in a Wi-Fi spectrum;
  determining a median value of the standard deviations over all subcarriers in the Wi-Fi spectrum; and
  determining whether the macro-movements are present in the filtered CSI based on the median value of the standard deviations over all subcarriers.

4. The method of claim 1, wherein executing the occupancy detection module further comprises:
determining whether the micro-movements and the breath signals are present in the filtered CSI, comprising:
  determining a standard deviation of the filtered CSI over a third observation window for each subcarrier in a Wi-Fi spectrum, wherein the third observation window is longer than the first observation window and shorter than the second observation window;

determining a median value of the standard deviations over all subcarriers in the Wi-Fi spectrum;

determining one or more indicators of breathing based on energy of the filtered CSI over a given range of frequencies and over the second observation window;

determining a feature vector based on the median value of the standard deviations over all subcarriers and the one or more indicators of breathing; and determining, based on the feature vector and using a machine learning model, whether small movements and breath signals are present in the filtered CSI.

5. The method of claim 4, wherein the machine learning model comprises a random forest model or an XGBoost model.

6. The method of claim 1, wherein filtering the CSI to remove the RF interference comprises:

dividing a Wi-Fi spectrum of the CSI into sub-bands;

for each sub-band, determining a number of peaks, a number of high peaks, and a peak prominence ratio; and filtering out the CSI in response to determining that any of the number of peaks, the number of high peaks, or the peak prominence ratio exceeds a corresponding threshold for any sub-band.

7. The method of claim 1, further comprising:

adapting a threshold for breath signal detection or motion detection based on average inter-packet time.

8. A device comprising:

a transceiver; and a processor operably connected to the transceiver, the processor configured to:

obtain wireless fidelity (Wi-Fi) based channel state information (CSI);

filter the CSI to remove radio frequency (RF) interference;

execute a motion detection module comprising:

detect for motion in a space based on whether macro-movements are present in the filtered CSI; and provide an indication that the space is occupied upon detecting motion in the space, wherein the motion detection module detects for motion during a first observation window; and in response to the indication that the space is occupied, execute an occupancy detection module comprising:

detect whether the space is still occupied based on whether micro-movements and breath signals are present in the filtered CSI;

retain the indication that the space is occupied upon detecting that the space is still occupied; and provide an indication that the space is not occupied upon detecting that the space is no longer occupied, wherein the occupancy detection module detects for motion during a second observation window, the second observation window being longer than the first observation window.

9. The device of claim 8, wherein:

the first observation window is less than 2 seconds in duration, and the second observation window is between 10 seconds and 90 seconds in duration.

10. The device of claim 8, wherein to execute the motion detection module, the processor is further configured to:

determine whether the macro-movements are present in the filtered CSI, comprising:

determine a standard deviation of the filtered CSI over the first observation window for each subcarrier in a Wi-Fi spectrum;

determine a median value of the standard deviations over all subcarriers in the Wi-Fi spectrum; and determine whether the macro-movements are present in the filtered CSI based on the median value of the standard deviations over all subcarriers.

11. The device of claim 8, wherein to execute the occupancy detection module, the processor is further configured to:

determine whether the micro-movements and the breath signals are present in the filtered CSI, comprising:

determine a standard deviation of the filtered CSI over a third observation window for each subcarrier in a Wi-Fi spectrum, wherein the third observation window is longer than the first observation window and shorter than the second observation window;

determine a median value of the standard deviations over all subcarriers in the Wi-Fi spectrum;

determine one or more indicators of breathing based on energy of the filtered CSI over a given range of frequencies and over the second observation window;

determine a feature vector based on the median value of the standard deviations over all subcarriers and the one or more indicators of breathing; and determine, based on the feature vector and using a machine learning model, whether small movements and breath signals are present in the filtered CSI.

12. The device of claim 11, wherein the machine learning model comprises a random forest model or an XGBoost model.

13. The device of claim 8, wherein to filter the CSI to remove the RF interference, the processor is configured to:

divide a Wi-Fi spectrum of the CSI into sub-bands;

for each sub-band, determine a number of peaks, a number of high peaks, and a peak prominence ratio; and filter out the CSI in response to determining that any of the number of peaks, the number of high peaks, or the peak prominence ratio exceeds a corresponding threshold for any sub-band.

14. The device of claim 8, wherein the processor is further configured to:

adapt a threshold for breath signal detection or motion detection based on average inter-packet time.

15. A non-transitory computer readable medium comprising program code that, when executed by a processor of a device, causes the device to:

obtain wireless fidelity (Wi-Fi) based channel state information (CSI);

filter the CSI to remove radio frequency (RF) interference;

execute a motion detection module comprising:

detect for motion in a space based on whether macro-movements are present in the filtered CSI; and provide an indication that the space is occupied upon detecting motion in the space, wherein the motion detection module detects for motion during a first observation window; and in response to the indication that the space is occupied, execute an occupancy detection module comprising:

detect whether the space is still occupied based on whether micro-movements and breath signals are present in the filtered CSI;

retain the indication that the space is occupied upon detecting that the space is still occupied; and provide an indication that the space is not occupied upon detecting that the space is no longer occupied, wherein the occupancy detection module detects for motion during a second observation window, the second observation window being longer than the first observation window.

16. The non-transitory computer readable medium of claim 15, wherein:

the first observation window is less than 2 seconds in duration, and the second observation window is between 10 seconds and 90 seconds in duration.

17. The non-transitory computer readable medium of claim 15, wherein the program code to execute the motion detection module further comprises program code to:

determine whether the macro-movements are present in the filtered CSI, comprising:

determine a standard deviation of the filtered CSI over the first observation window for each subcarrier in a Wi-Fi spectrum;

determine a median value of the standard deviations over all subcarriers in the Wi-Fi spectrum; and determine whether the macro-movements are present in the filtered CSI based on the median value of the standard deviations over all subcarriers.

18. The non-transitory computer readable medium of claim 15, wherein the program code to execute the occupancy detection module further comprises program code to:

determine whether the micro-movements and the breath signals are present in the filtered CSI, comprising:

determine a standard deviation of the filtered CSI over a third observation window for each subcarrier in a Wi-Fi spectrum, wherein the third observation window is longer than the first observation window and shorter than the second observation window;

determine a median value of the standard deviations over all subcarriers in the Wi-Fi spectrum;

determine one or more indicators of breathing based on energy of the filtered CSI over a given range of frequencies and over the second observation window;

determine a feature vector based on the median value of the standard deviations over all subcarriers and the one or more indicators of breathing; and determine, based on the feature vector and using a machine learning model, whether small movements and breath signals are present in the filtered CSI.

19. The non-transitory computer readable medium of claim 18, wherein the machine learning model comprises a random forest model or an XGBoost model.

20. The non-transitory computer readable medium of claim 15, wherein the program code to filter the CSI to remove the RF interference further comprises program code to:

divide a Wi-Fi spectrum of the CSI into sub-bands;

for each sub-band, determine a number of peaks, a number of high peaks, and a peak prominence ratio; and filter out the CSI in response to determining that any of the number of peaks, the number of high peaks, or the peak prominence ratio exceeds a corresponding threshold for any sub-band.

\* \* \* \* \*